United States Patent [19]

Atherton et al.

[11] Patent Number: 5,713,529
[45] Date of Patent: Feb. 3, 1998

[54] BALANCED ROTOR SPINNING FISHING REEL

[75] Inventors: Randy Lee Atherton; Kent Lee Zwayer, both of Tulsa, Okla.

[73] Assignee: Zebco Div. of Brunswick Corporation, Tulsa, Okla.

[21] Appl. No.: 419,725

[22] Filed: Apr. 10, 1995

[51] Int. Cl.$^6$ .................................................. A01K 89/01
[52] U.S. Cl. ........................................................... 242/231
[58] Field of Search ........................................ 242/230, 231, 242/232, 233

[56] References Cited

U.S. PATENT DOCUMENTS

| | | | |
|---|---|---|---|
| 4,389,027 | 6/1983 | Sazaki et al. | 242/233 |
| 5,350,129 | 9/1994 | Furomoto et al. | 242/231 |
| 5,362,012 | 11/1994 | Ban | 242/246 X |
| 5,379,957 | 1/1995 | Furomoto et al. | 242/230 |

FOREIGN PATENT DOCUMENTS

| | | | |
|---|---|---|---|
| 585947 | 3/1994 | European Pat. Off. | 242/230 |
| 5-137485 | 6/1993 | Japan | 242/231 |
| 2257880 | 1/1993 | United Kingdom | 242/230 |
| 2260250 | 4/1993 | United Kingdom | 242/231 |

*Primary Examiner*—Katherine Matecki
*Attorney, Agent, or Firm*—Wood, Phillips, VanSanten, Clark & Mortimer

[57] ABSTRACT

A rotor assembly that is operable to wrap fishing line around a spool. The rotor assembly has a body with a circumference and a central axis about which the rotor assembly rotates in operation, a first bail ear and a second bail ear on the body, a bail assembly including first and second bail arms and a bail wire, first structure for mounting the first bail arm to the first bail ear for pivoting movement of the first bail arm relative to the first bail ear about a first axis, and second structure for mounting the second bail arm to the second bail ear for pivoting movement of the second bail arm relative to the second bail ear about a second axis. The first and second bail ears have first and second circumferential center lines extending axially of the body. The first center line makes a first acute angle with a first plane containing both a line parallel to the first axis and the central axis of the body. The second center line makes a second acute angle with a second plane containing both a line parallel to the second axis and the central axis of the body.

16 Claims, 4 Drawing Sheets

BALANCED ROTOR SPINNING FISHING REEL

BACKGROUND OF THE INVENTION

1. Field of the Invention

This invention relates to fishing reels having a rotor with an associated bail assembly for wrapping line onto a spool and, more particularly, to a rotor having its mass distributed to counterbalance centrifugal forces developed on the bail assembly in operation.

2. Background Art

One well known type of fishing reel is the spinning-style fishing reel. A spinning reel typically has a housing with an oscillating spool at its forward end. A rotor rotates about the spool axis and has an associated bail assembly that wraps line onto the oscillating spool. In one construction, the rotor has a body with integrally formed ears at diametrically opposite locations that define a support for a pair of bail arms between which a U-shaped bail wire is connected.

It is one objective of designers of spinning reels to design a rotor assembly that operates smoothly. To achieve this end, the rotor assembly must be dynamically balanced. In the absence of proper balancing, the rotor assembly, which may be operated at relatively high speeds, wobbles detectably.

The largest forces to be balanced are developed on the bail wire. To accomplish this, it is known in the art, as shown for example in U.S. Pat. No. 5,350,129, to strategically locate weights around the rotor. This is inconvenient, may complicate the manufacturing process, and undesirably adds weight to the rotor.

It is also known to distribute the mass of the rotor ears so that the forces produced on the bail wire are counterbalanced. This is conventionally accomplished by shifting the rotor ears to an off-center position.

In one conventional construction, the rotor ears have a generally rectangular circumferential shape with a longer and a shorter dimension. The longer dimension is aligned with the rotational axis of the rotor. The circumferential center axes of the ears are parallel to each other and the rotational axis for the rotor and radially offset from a plane containing the rotational axis. Weights are added as required to effect fine balancing.

SUMMARY OF THE INVENTION

The present invention offers an alternative to the conventional offset bail ear design of the prior art.

In one form of the invention, a rotor assembly is provided that is operable to wrap fishing line around a spool. The rotor assembly has a body with a circumference and a central axis about which the rotor assembly rotates in operation, a first bail ear and a second bail ear on the body, a bail assembly including first and second bail arms and a bail wire, first structure for mounting the first bail arm to the first bail ear for pivoting movement of the first bail arm relative to the first bail ear about a first axis, and second structure for mounting the second bail arm to the second bail ear for pivoting movement of the second bail ear about a second axis. The first bail ear has a first circumferential center line extending axially of the body, with the second bail ear having a second circumferential center line extending axially of the body. The first center line makes a first acute angle with a first plane containing both a line parallel to the first axis and the central axis of the body with the second center line making a second acute angle with a second plane containing both a line parallel to the second axis and the central axis of the body.

The reel can be dynamically balanced without adding weight to the rotor assembly.

In one form, the body has an axial extent and the first and second center lines each intersect the first plane along the axial extent of the rotor body.

The first and second acute angles may be between 10° and 30° and, in one form, are approximately 20°. Preferably, these angles are chosen to dynamically balance the rotor assembly. The first and second acute angles may be the same or different. The first and second planes may be a common plane. In one such construction, the first and second axes are on the same side of this common plane.

In one form, the bail assembly is movable relative to the body between a east position and a retrieve position. The rotor assembly has a front and rear. The bail wire has a U-shaped configuration with a base and legs connected one each to the first and second bail arms such that with the bail assembly in a retrieve position the base of the bail wire resides radially on one side of the common plane and the first and second circumferential center lines extend forwardly from the same plane angularly away from the one side of the common plane.

The body may include an annular skirt, with the first and second bail ears being formed as one piece with the annular skirt.

In one form, the first and second bail ears each have a substantially rectangular circumferential shape with a longer and a shorter dimension, with the longer dimension of the bail ears extending axially of the body.

The first and second bail ears may project axially forwardly beyond the front of the annular skirt.

In another form of the invention, a rotor assembly is provided having a body with a circumference and a central axis about which the rotor assembly rotates in operation, a first bail ear and a second bail ear on the body, a bail assembly including first and second bail arms and a bail wire, first structure for mounting the first bail arm to the first bail ear for pivoting movement of the first bail arm relative to the first bail ear about a first axis, and second structure for mounting the second bail arm to the second bail ear for pivoting movement of the second bail arm relative to the second bail ear about a second axis. The first and second ears have an elongate shape with the lengths of each being non-parallel to the central axis of the body.

The lengths of the first and second bail ears can project forwardly at an angle of between 10° and 30° from a first plane containing both a line parallel to the first axis and the central axis of the body. In another form, this angle is 20°.

In another form of the invention, a rotor assembly is provided having a body with a circumference and a central axis about which the rotor assembly rotates in operation, a first bail ear and a second bail ear on the body, a bail assembly including first and second bail arms and a bail wire, first structure for mounting the first bail arm to the first bail ear for pivoting movement of the first bail arm relative to the first bail ear about a first axis, and second structure for mounting the second bail arm to the second bail ear for pivoting movement of the second bail ear relative to the second bail arm about a second axis. Each bail ear has a mass. The proportion of mass of the first bail ear on radially opposite sides of a first plane containing both a line parallel to the first axis and the central axis of the body varies along the axial extent of the ear. The mass of the second bail ear likewise varies relative to a second plane containing both a line parallel to the second axis and the central axis of the body.

In one form, the bail assembly is movable relative to the body between a cast position and a retrieve position. The bail wire has a U-shaped configuration with a base, a first leg connected to the first bail arm, and a second leg connected to the second bail arm. With the bail assembly in a retrieve position, the base of the bail wire resides radially on one side of the first plane and the proportion of mass on the other side of the first plane increases in a forward direction.

DETAILED DESCRIPTION OF THE DRAWINGS

Figure 1:
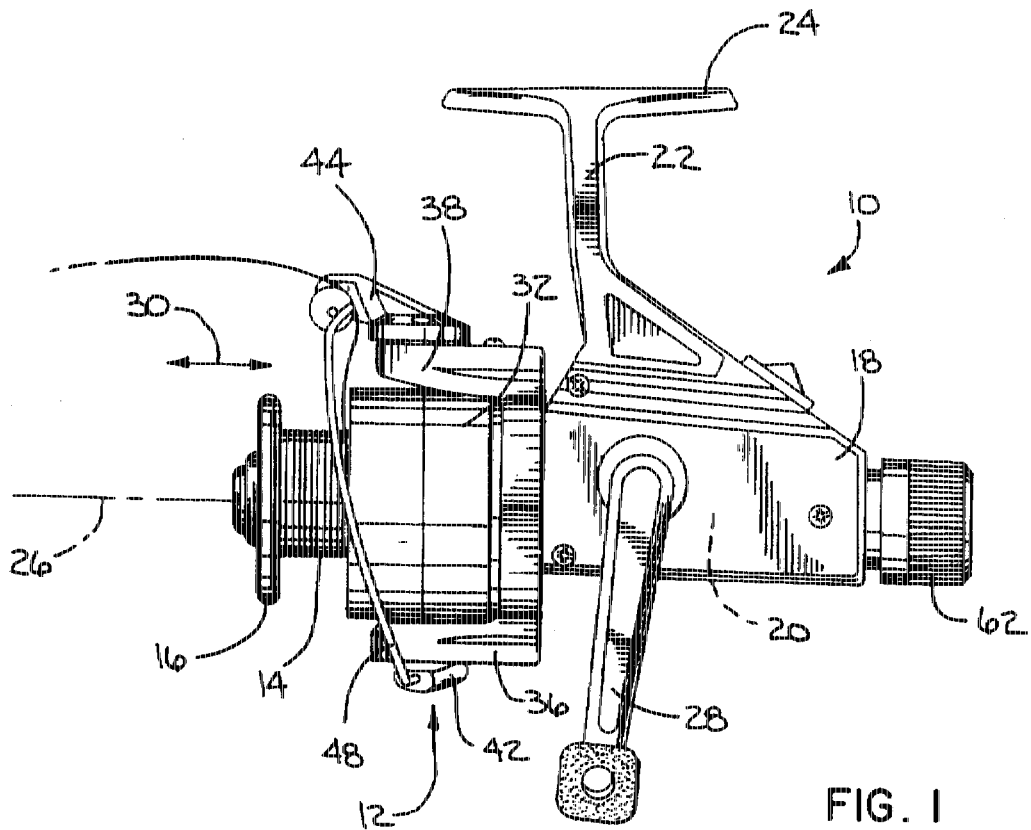
FIG. 1 is a side elevation view of a spinning fishing reel having a rotor assembly, according to the present invention, incorporated therein.

In FIGS. 1 and 3–6, a spinning-type fishing reel, according to the present invention, is shown at 10. The focus of the present invention is on the rotor assembly at 12, which is operable to wrap a supply of line 14 around a spool 16 at the front of the reel 10. It should be understood that the reel 10 described herein is only exemplary of an environment for the inventive rotor assembly 12. Many variations in the configuration of the reel 10 shown are contemplated by the invention.

The reel 10 has a main housing 18 which encases an operating mechanism 20. The housing 18 has an integrally formed stem 22 which terminates at a foot 24, which is attachable to a fishing rod (not shown) by conventional means.

The rotor assembly 12 is rotated about a central axis 26 by a crank handle 28 through the operating mechanism 20. As this occurs, the rotor assembly 12 wraps the line 14 continuously about the spool 16. The operating mechanism 20 includes structure for oscillating the spool 16 in a fore and aft direction, as indicated by the double-headed arrow 30, as the rotor assembly 12 rotates, to thereby assure that the line 14 is evenly distributed along the axial extent of the spool 16.

The rotor assembly 12 has a body 32 with an annular skirt 34 and diametrically oppositely located first and second ears 36,38, which cooperatively define a support for a movable bail assembly 40.

The bail assembly 40 has a first bail arm 42 mounted to the first bail ear 36 and a second bail arm 44 mounted to the bail ear 38. A U-shaped bail wire 48 has a base portion 49 and legs projecting from the base portion 49 and fixedly attached, one each to the bail arms 42,44, so that the bail arms 42,44 and bail wire 48 are movable as a unit.

The bail arm 42 is connected to the bail ear 36 to be pivotable relative thereto about an axis 50. The bail arm 44 is attached to the bail ear 38 for pivoting movement relative thereto about an axis 52. The axes 50,52 are parallel and preferably coincident. With this arrangement, the bail assembly 40 is pivotable as a unit relative to the rotor body 32 about the axes 50,52 between a cast position, shown in FIG. 5, and a retrieve position, shown in FIG. 4.

Through an over-center bias mechanism 54 within at least one of the bail ears 36,38, the bail arms 42,44, and thus the entire bail assembly 40, are biased into the cast and retrieve positions as the bail assembly 40 approaches each.

Suitable structure for pivotably attaching the bail assembly 40 to the body 32 and for biasing the bail assembly 40 into each of the cast and retrieve positions is well known in the art. For example, one suitable structure for accomplishing this is described in detail in U.S. Pat. No. 5,004,182, to Councilman, which is incorporated herein by reference.

In the retrieve position for the bail assembly 40, line 14 is allowed to freely pay off of the spool 16. To change the bail assembly from the cast position to the retrieve position, the crank handle 28 is operated. Through a mechanism shown also in U.S. Pat. No. 5,004,182, rotation of the rotor assembly 12 causes the bail assembly 40 to be deflected out of the cast position and into the retrieve position.

In the transition from the cast position to the retrieve position, the line 14 is guided along an edge 56 of the bail wire 48 and into a receptacle 58 defined in part by the bail arm 44. With the reel 10 in the retrieve position, the line 14 extends from the spool 16, through the receptacle 58, around a cylindrical guide roller 60, and forwardly from the guide roller 60 away from the reel 10.

Figure 4:
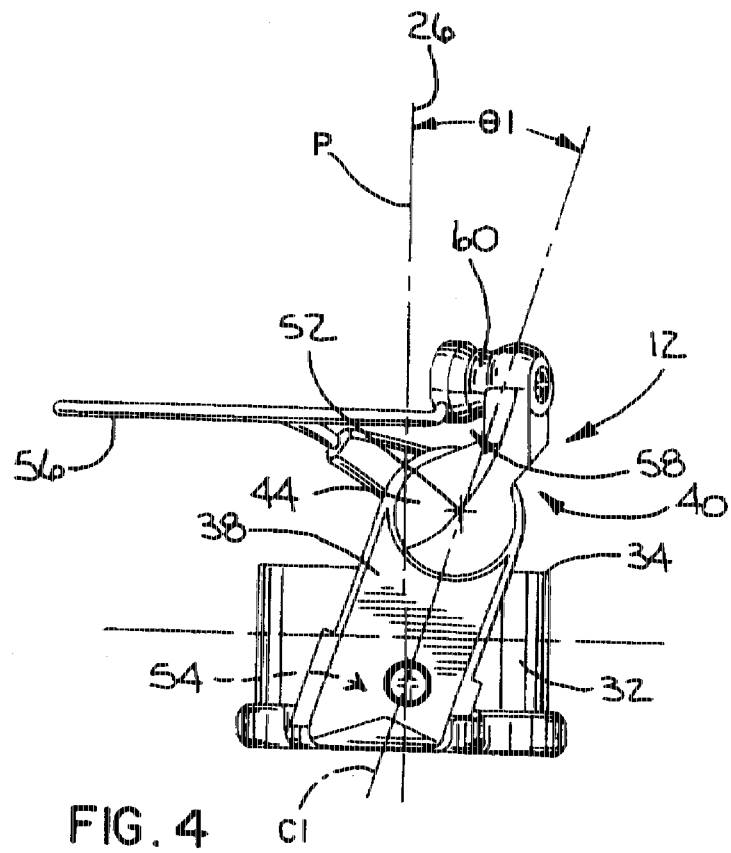
FIG. 4 is a side elevation view of the rotor assembly in FIG. 3, with a bail assembly thereon in a retrieve position.
Figure 5:
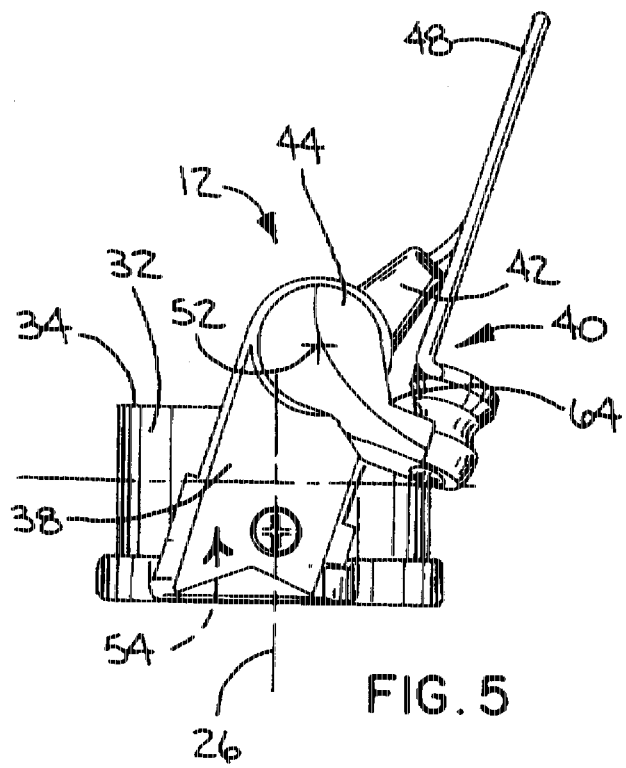
FIG. 5 is a view as in FIG. 4 with the bail assembly in a cast position.
Figure 6:
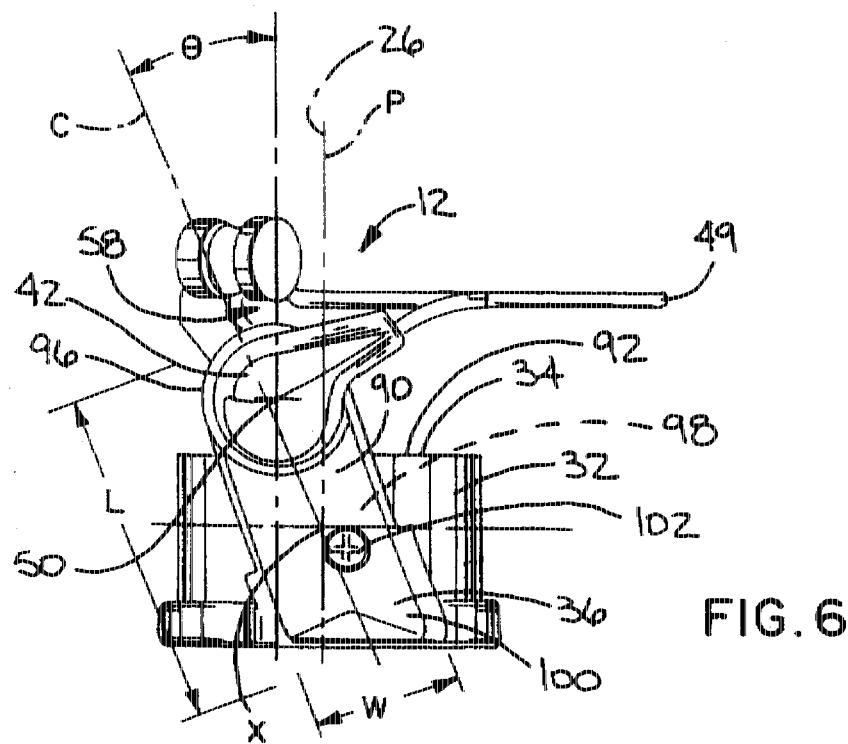
FIG. 6 is a side elevation view of the rotor assembly taken from the side opposite that in FIG. 4.

The operating mechanism 20 includes a drag system which allows the spool 16 to rotate about the central axis 26 to release line 14 from the spool 16 with the bail assembly 40 in the retrieve position of FIG. 4. As this occurs, the roller 60 turns to prevent binding of the line 14. The amount of torque required to release the spool 16 is variable through a drag knob 62 at the rear of the reel 10.

Operation of the crank handle 28, with the bail assembly 40 in the retrieve position, causes the rotor assembly 12 to rotate clockwise about the axis 26 as viewed from the front of the spool in FIG. 4. This brings a U-shaped surface 64 on the bail arm 44 against the line 14 and causes the line 14 to wrap around the spool 16 as the rotor assembly 12 rotates.

Modern fishing reels may be geared to retrieve line at a rapid rate. As this occurs, a substantial centrifugal force is produced on the bail wire 48 which, if not countered, would cause severe vibration. One known structure used to counterbalance the forces produced on the bail wire 48 is shown in FIG. 2.

Figure 2:
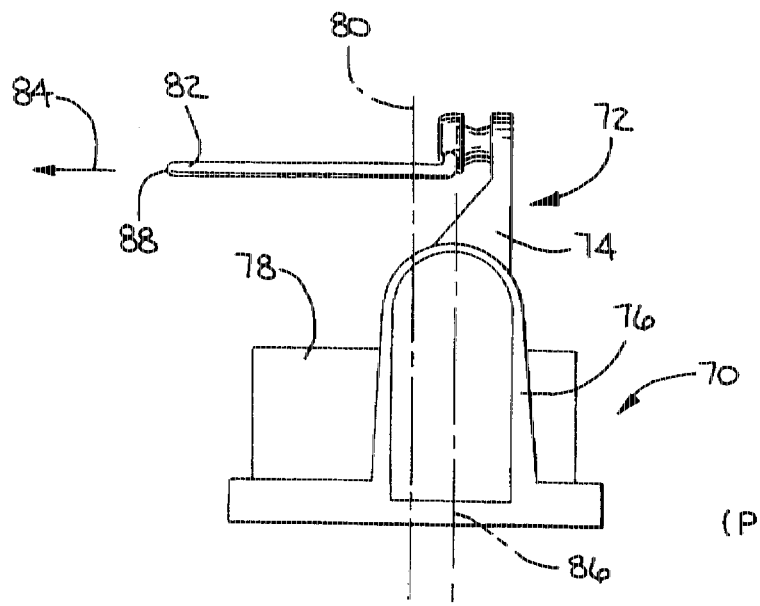
FIG. 2 is a side elevation view of a prior art rotor assembly.
Figure 3:
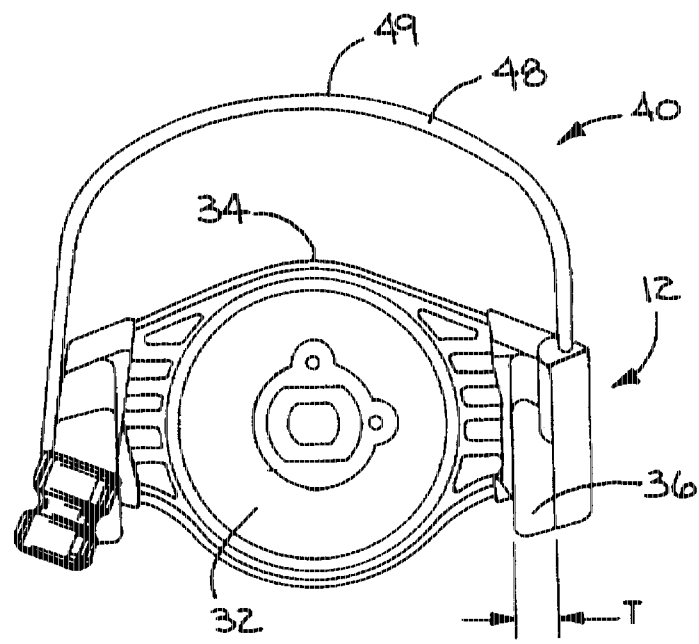
FIG. 3 is an end elevation view of the rotor assembly on the fishing reel in FIG. 1, with a line carrying spool removed therefrom.

In FIG. 2, a rotor assembly is shown at 70 and has a bail assembly 72 including diametrically opposite bail arms 74 (one shown) pivotably connected to bail ears 76 (one shown) on a cylindrical body 78. With the rotor assembly 70 rotating about the central axis 80, the mass of a bail wire 82 causes a centrifugal force to be developed radially in the direction of arrow 84. This force is countered by shifting the bail ears 76 radially so that the longitudinal center axis 86 of each ear 76 is offset from the rotor axis 80 on the side of the axis 80 diametrically opposite to the base 88 of the bail wire 48.

The present invention provides an alternative to the counterbalancing arrangement of the bail ears 76 shown in FIG. 2, i.e. the shifting of the ear axis 86 away from the rotor axis 80, and obviates, in virtually all designs, the need for additional weights to dynamically balance the rotor assembly. Each of the inventive bail ears 36,38 is similarly constructed. Consequently, detailed description below will be limited to one exemplary bail ear 36.

The bail ear 36 has a radial thickness T and a circumferential outer surface 90 that is generally rectangular, with a longer length dimension L and a shorter width dimension W. A center axis C bisects the length of the surface 90 and makes an acute angle θ with a plane P containing both a line parallel to the axis 50 and the axis 26. The angle θ is on the order of 10° to 30° and, in one form, approximately 20°. The center line C intersects this plane P within the axial extent of the rotor body 32 at a point X. The angles made by the central axes of the bail ears 36, 38 may be the same or different, which depends in large pan on the configuration of the ears 36, 38.

The inventive concept can be explained in relatively simple terms with respect to the prior an rotor assembly 70 in FIG. 2. The rotational axis for the bail assembly 72 is shifted to one side of the axis 86 while the rear portions of the ear 76 are shifted to the other side of the axis 86. With this arrangement, the length of the ear 36 is non-parallel to the axis 26 and the ear 36 projects in cantilever fashion forwardly beyond the front 92 of the rotor body 32. As a result, the proportion of mass on radially opposite sides of the plane P varies along the axial extent of the ear 36 and increases toward the front thereof. The mass of the ear 36 is relatively evenly distributed on opposite sides of the plane P at the rear portion of the body 32. At the forwardmost portion of the ear 36, substantially the entire mass is on the side of the plane P opposite to the base 49 of the U-shaped bail wire 48. This arrangement causes dynamic balancing of the mass of the bail wire 48 without addition of weight to the rotor assembly 12.

The bail ear 36 can be formed as one piece with the skirt 34. The thickness T of the bail ear 36 can be substantially uniform along its length L. In the embodiment shown, the bail ear has a peripheral flange 96 which defines an internal chamber 98 to accommodate the previously identified mechanism for biasing the bail assembly 40 towards the cast and retrieve positions. A flat plate 100 is held releasably in place to cover the chamber 98 by a screw 102.

The bail ear 38 is similarly constructed such that the circumferential center line C1 makes an angle θ1 with the same plane P passing through the rotor central axis 26 and an axis parallel to the axis 52.

The angle at which the bail ears 36,38 project is determined by the shape, size, and weight of the bail wire 48, the material from which the rotor assembly 12 including the ears 36,38 is constructed, etc. A specific construction to balance the rotor assembly 12 can be designed by one of ordinary skill in the art.

The foregoing disclosure of specific embodiments is intended to be illustrative of the broad concepts comprehended by the invention.

Figure 7:
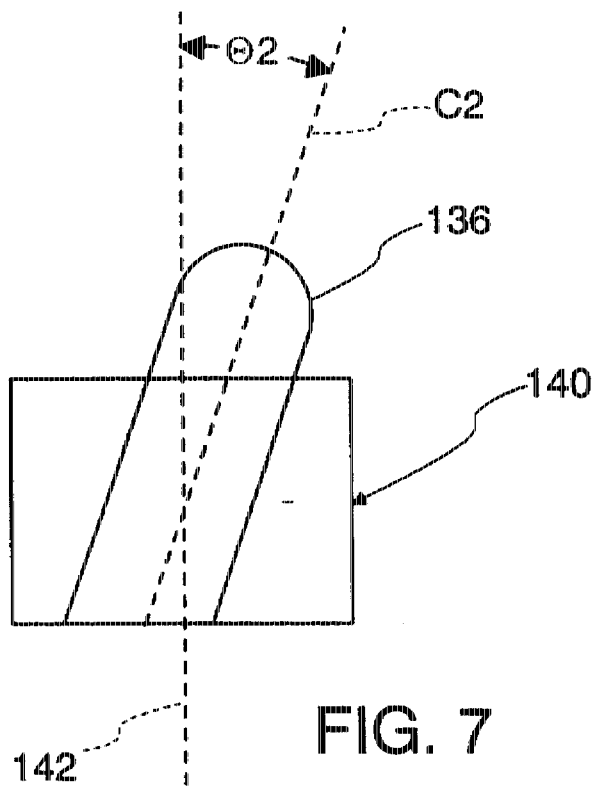
FIG. 7 is a schematic, side elevation view of a rotor assembly, according to the present invention.
Figure 8:
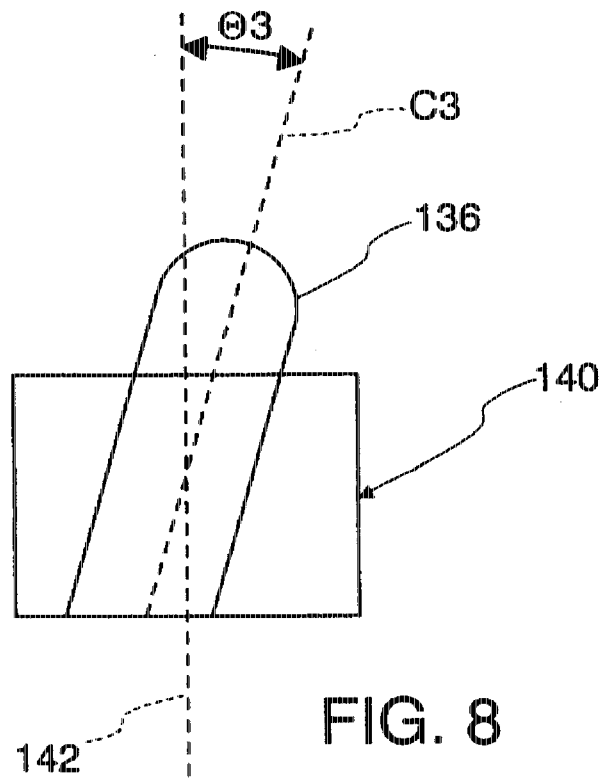
FIG. 8 is a view as in FIG. 7 taken from the side opposite that in FIG. 7.

In FIGS. 7 and 8, bail ears 136, 138, corresponding to those 36, 38 previously described, are shown schematically as part of a rotor assembly 140. The angle between the central axis C2 for the bail ear 136 and the central axis 142 for the rotor assembly 140 is identified as θ2, with the corresponding angle between the central axis C3 for the bail ear and the central axis 142 identified as θ3. The angles θ2 and θ3 are different, and determined by the masses to be dynamically balanced by each bail ear 136. 138.

We claim:

1. A rotor assembly that is operable to wrap fishing line around a spool on a fishing reel, said rotor assembly comprising:

a body having a circumference and a central axis about which the rotor assembly rotates in operation;

a first bail ear and a second bail ear on the body;

a bail assembly including a first bail arm, a second bail arm and a bail wire;

first means for mounting the first bail arm to the first bail ear for pivoting movement of the first bail arm relative to the first bail ear about a first axis, said first bail ear having a first circumferential center line extending axially of the body; and second means for mounting the second bail arm to the second bail ear for pivoting movement of the second bail arm relative to the second bail ear about a second axis, said second bail ear having a second circumferential center line extending axially of the body, wherein the first circumferential center line makes a first acute angle with a first plane containing both a line parallel to the first axis and the central axis of the body and the second circumferential center line makes a second acute angle with a second plane containing both a line parallel to the second axis and the central axis of the body, wherein the first and second acute angles are different.

2. The rotor assembly according to claim 1 wherein the body has an axial extent and the first and second center lines each intersect the first plane along the axial extent of the rotor body.

3. The rotor assembly according to claim 1 wherein the first and second acute angles are each between 10° and 30°.

4. The rotor assembly according to claim 1 wherein the bail assembly is movable relative to the body between a cast position and a retrieve position, the rotor assembly has a front and rear, the bail wire has a U-shaped configuration with a base and legs connected one each to the first and second bail arms, and with the bail assembly in a retrieve position the base of the bail wire resides radially on one side of the same plane and the first and second circumferential center lines each extend forwardly from the same plane angularly away from the one side of the same plane.

5. The rotor assembly according to claim 1 wherein the body includes an annular skirt and the first and second bail ears are formed as one piece with the annular skirt.

6. The rotor assembly according to claim 1 wherein the first and second bail ears each have a substantially rectangular circumferential shape with a longer and a shorter dimension and the longer dimension of the first and second bail ears extends axially of the body.

7. The rotor assembly according to claim 1 wherein the body has a front and rear and an annular skirt and the first and second bail ears project axially forwardly beyond the front of the annular skirt.

8. The rotor assembly according to claim 1 wherein the first and second circumferential axes make first and second acute angles with the first and second planes sufficient to dynamically balance the rotor.

9. The rotor assembly according to claim 8 wherein the first and second planes are the same plane and the first and second axes are both on the same side of the same plane.

10. A rotor assembly that is operable to wrap fishing line around a spool, said rotor assembly comprising:

a body having a circumference and a central axis about which the rotor assembly rotates in operation;

a first bail ear and a second bail ear on the body;

a bail assembly including a first bail arm, a second bail arm and a bail wire;

first means for mounting the first bail arm to the first bail ear for pivoting movement of the first bail arm relative to the first bail ear about a first axis, said first bail ear having a first elongate shape; and second means for mounting the second bail arm to the second bail ear for pivoting movement of the second bail arm relative to the second bail ear about a second axis, said second bail ear having an elongate shape, wherein the lengths of each of the first bail ear and second bail ear are non-parallel to the central axis of the body, wherein the rotor assembly has a front and rear and the first and second bail ears each project forwardly at an angle of between 10° and 30° from a first plane containing both a line parallel to the first axis and the central axis of the body, the lengths of the first and second bail ears projecting at different angles to the first plane.

11. The rotor assembly according to claim 10 wherein the body has a front and rear and an annular skirt and the first and second bail ears project forwardly beyond the front of the annular skirt.

12. The rotor assembly according to claim 11 wherein the first and second bail ears are formed as one piece with the annular skirt.

13. A rotor assembly that is operable to wrap fishing line around a spool on a fishing reel, said rotor assembly comprising:

a body having a circumference, a central axis about which the rotor assembly rotates in operation and axially spaced forward and rear ends;

a first bail ear and a second bail ear on the body;

a bail assembly including a first bail arm, a second bail arm and a bail wire;

first means for mounting the first bail arm to the first bail ear for pivoting movement of the first bail arm relative to the first bail ear about a first axis, said first bail ear having a mass; and second means for mounting the second bail arm to the second bail ear for pivoting movement of the second bail arm relative to the second bail ear about a second axis, said second bail ear having a mass, the proportion of mass of the first bail ear on radially opposite sides of a first plane containing both a line parallel to the first axis and the central axis of the body varying along the axial extent of the first bail ear, the proportion of mass of the second bail ear on radially opposite sides of a second plane containing both a line parallel to the second axis and the central axis of the body varying along the axial extent of the second bail ear, wherein the proportion of mass of the first bail ear on radially opposite sides of the first plane is different than the proportion of mass of the second bail ear on radially opposite sides of the second plane over at least part of the distance between the forward and rear ends of the body.

14. The rotor assembly according to claim 13 wherein the first and second bail ears have a substantially rectangular circumferential shape with a longer and a shorter dimension and the longer dimension of the first and second bail ears extends axially of the body.

15. The rotor assembly according to claim 13 wherein the body has an annular skin and the first and second bail ears project axially forwardly beyond the front of the annular skin.

16. The rotor assembly according to claim 15 wherein the first and second bail ears are formed as one piece with the annular skirt.

* * * * *